US006991697B2

(12) United States Patent
Weder et al.

(10) Patent No.: US 6,991,697 B2
(45) Date of Patent: *Jan. 31, 2006

(54) METHOD OF COVERING A FLOWER POT OR FLORAL GROUPING

(75) Inventors: Donald E. Weder, Highland, IL (US); Joseph G. Straeter, Highland, IL (US)

(73) Assignee: Wanda M. Weder and William F. Straeter, Highland, IL (US), not individually but solely as Trustees of The Family Trust, U/T/A, dated Dec. 8, 1995

( * ) Notice: Subject to any disclaimer, the term of this patent is extended or adjusted under 35 U.S.C. 154(b) by 0 days.

This patent is subject to a terminal disclaimer.

(21) Appl. No.: 11/096,088

(22) Filed: Mar. 31, 2005

(65) Prior Publication Data

US 2005/0167039 A1    Aug. 4, 2005

Related U.S. Application Data

(63) Continuation of application No. 10/826,616, filed on Apr. 16, 2004, now Pat. No. 6,956,045, which is a continuation of application No. 10/366,738, filed on Feb. 14, 2003, now abandoned, which is a continuation of application No. 09/819,309, filed on Mar. 28, 2001, now Pat. No. 6,533,886, which is a continuation of application No. 09/056,522, filed on Apr. 7, 1998, now abandoned, which is a continuation of application No. 08/440,038, filed on May 12, 1995, now Pat. No. 5,820,712, which is a continuation of application No. 08/003,777, filed on Jan. 13, 1993, now Pat. No. 5,459,976.

(51) Int. Cl.
*B32B 31/12* (2006.01)

(52) U.S. Cl. .................... 156/256; 156/214; 156/293

(58) Field of Classification Search ............... 156/212, 156/213, 214, 215, 247, 249, 256, 289, 293; 493/95; 53/397, 399; 47/72
See application file for complete search history.

(56) References Cited

U.S. PATENT DOCUMENTS

| 682,817 A | 9/1901 | Shaner |
| 898,273 A | 9/1908 | Silger et al. |
| 1,215,464 A | 2/1917 | Armstrong |
| 1,525,015 A | 2/1925 | Weeks |

(Continued)

FOREIGN PATENT DOCUMENTS

FR    2 610 604    2/1987

(Continued)

OTHER PUBLICATIONS

Speed Cover Brochure, "The Simple Solution For Those Peak Volume Periods"; Highland Supply Corporation; copyright 1989.

(Continued)

*Primary Examiner*—Melvin Mayes
(74) *Attorney, Agent, or Firm*—Dunlap, Codding & Rogers, P.C.

(57) ABSTRACT

A method for covering a flower pot with a sheet of material or a pot cover. At least a portion of a sheet of material, or the inner surface of the pot cover and/or the outer surface of the flower pot is provided with a bonding material such that upon wrapping the sheet of material about the outer surface of the flower pot or placing the flower pot in an interior space of the pot cover, the flower pot is secured to the sheet of material wrapped thereabout or the pot cover via the bonding material.

16 Claims, 8 Drawing Sheets

U.S. PATENT DOCUMENTS

| | | |
|---|---|---|
| 1,610,652 A | 12/1926 | Bouchard |
| 1,697,751 A | 1/1929 | Blake |
| 1,818,198 A | 8/1931 | Oavis |
| 1,868,283 A | 7/1932 | Fleischer |
| 1,962,722 A | 6/1934 | Krueger |
| 2,028,878 A | 1/1936 | Rider |
| 2,094,349 A | 9/1937 | Carlson |
| 2,170,147 A | 8/1939 | Lane |
| 2,294,670 A | 9/1942 | Krueger |
| 2,337,808 A | 12/1943 | Ford |
| 2,355,559 A | 8/1944 | Renner |
| 2,377,295 A | 5/1945 | Cook |
| 2,435,739 A | 2/1948 | Cutler |
| 2,469,030 A | 5/1949 | Brown |
| 2,529,060 A | 11/1950 | Trillich |
| 2,540,090 A | 2/1951 | Brackney |
| 2,546,522 A | 3/1951 | Quackenbush |
| 2,552,948 A | 5/1951 | Ferrato |
| 2,577,183 A | 12/1951 | Denton |
| 2,605,740 A | 8/1952 | Taylor et al. |
| 2,782,756 A | 2/1957 | Hunt |
| 2,806,443 A | 9/1957 | Horn et al. |
| 2,871,638 A | 2/1959 | Goodwin |
| 3,034,476 A | 5/1962 | Didde et al. |
| 3,057,326 A | 10/1962 | Jeddeloh |
| 3,271,922 A | 9/1966 | Wallerstein et al. |
| 3,376,666 A | 4/1968 | Leonard |
| 3,455,274 A | 7/1969 | Modersohn |
| 3,616,197 A | 10/1971 | Amberg et al. |
| 3,650,773 A | 3/1972 | Bush et al. |
| 3,754,642 A | 8/1973 | Stidolph |
| 3,767,104 A | 10/1973 | Bachman et al. |
| 3,782,599 A | 1/1974 | Luginbuhl |
| 3,924,561 A | 12/1975 | Ruthart et al. |
| 3,962,503 A | 6/1976 | Crawford |
| 4,508,223 A | 4/1985 | Catrambone |
| 4,532,754 A | 8/1985 | Hokanson |
| 4,660,502 A | 4/1987 | Scott |
| 4,667,453 A | 5/1987 | Goglio |
| 4,733,521 A | 3/1988 | Weder et al. |
| 4,773,182 A | 9/1988 | Weder et al. |
| 4,801,014 A | 1/1989 | Meadows |
| 4,849,043 A | 7/1989 | Instance |
| 4,897,031 A | 1/1990 | Weder |
| 4,900,390 A | 2/1990 | Colton et al. |
| 4,980,209 A | 12/1990 | Hill |
| 5,085,003 A | 2/1992 | Garcia |
| 5,106,449 A | 4/1992 | Fazzina et al. |
| 5,111,637 A | 5/1992 | Weder et al. |
| 5,111,638 A | 5/1992 | Weder |
| 5,120,382 A | 6/1992 | Weder |
| 5,156,702 A | 10/1992 | Weder |
| 5,239,775 A | 8/1993 | Landau |
| 5,459,976 A | 10/1995 | Weder et al. |
| 5,517,802 A | 5/1996 | Weder |
| 5,605,029 A | 2/1997 | Craig et al. |
| 5,820,712 A | 10/1998 | Weder et al. |
| 6,457,296 B1 | 10/2002 | Weder |
| 6,502,351 B2 | 1/2003 | Weder et al. |
| 6,533,886 B2 | 3/2003 | Weder et al. |
| 6,647,695 B2 * | 11/2003 | Weder ............... 53/397 |
| 6,769,225 B2 | 8/2004 | Weder |
| 6,779,301 B2 | 8/2004 | Weder |
| 6,782,657 B2 | 8/2004 | Weder |
| 6,782,658 B2 | 8/2004 | Weder |
| 6,789,356 B2 | 9/2004 | Weder |
| 6,789,372 B2 | 9/2004 | Weder |
| 6,796,104 B1 * | 9/2004 | Weder ............... 53/397 |
| 6,807,771 B2 * | 10/2004 | Weder et al. ......... 47/72 |
| 6,810,638 B2 * | 11/2004 | Weder ............... 53/399 |
| 6,823,625 B2 * | 11/2004 | Weder ............... 47/72 |
| 6,851,220 B2 * | 2/2005 | Weder ............... 47/72 |
| 6,860,063 B2 * | 3/2005 | Weder ............... 47/72 |
| 6,860,085 B2 * | 3/2005 | Weder et al. ......... 53/399 |
| 6,871,447 B2 * | 3/2005 | Weder et al. ......... 47/72 |
| 6,871,479 B2 * | 3/2005 | Craig et al. ......... 53/449 |
| 2003/0163975 A1 * | 9/2003 | Weder ............... 53/397 |

FOREIGN PATENT DOCUMENTS

| | | |
|---|---|---|
| FR | 2 619 698 | 3/1989 |
| GB | 2 128 083 | 4/1984 |
| GB | 2 252 708 | 8/1992 |

OTHER PUBLICATIONS

"Speed Sheets and Speed Rolls" Brochure; Highland Supply Corporation; copyright 1990.

3M Brochure "Scotch ATG Adhesive Systems".

"Post-it"; 3M Corp.; Self-stick removable notes—little sheets of paper connected with adhesive to form a pad.

"Derwent Abstract" of FR 26106054A; Noted abstract is an incorrect English translation of the contents of the French patent. French patent does not enable or disclose.

Adhesively attaching the covering to the container; 1988.

Adhesives Handbook; J. Shields; pp. 260, 345 & 346; 1970.

Farm Journal's House Plants for Give Giving; V.F. & G.A. Elbert; p. 93 and third unnumbered page of photos.

* cited by examiner

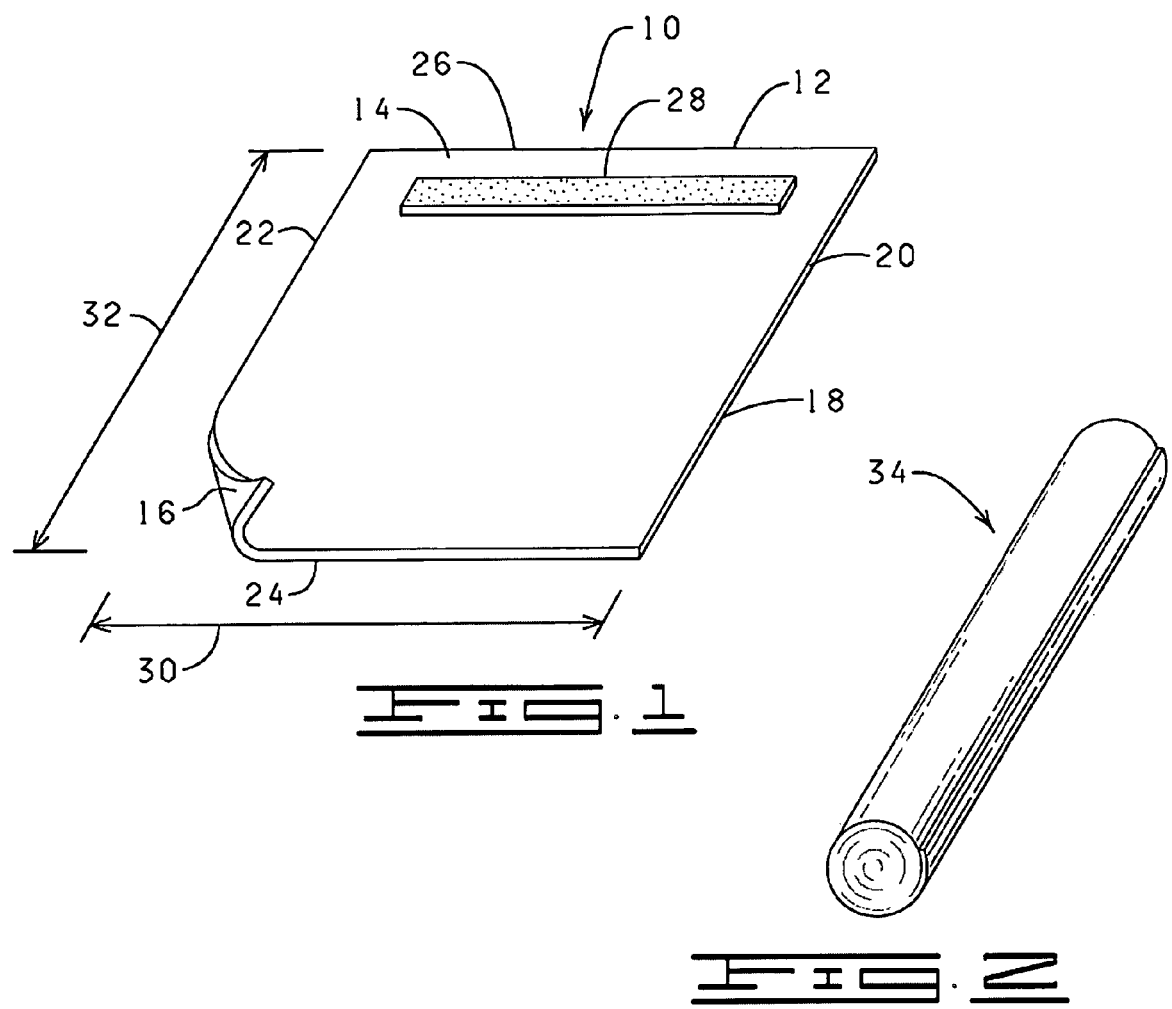
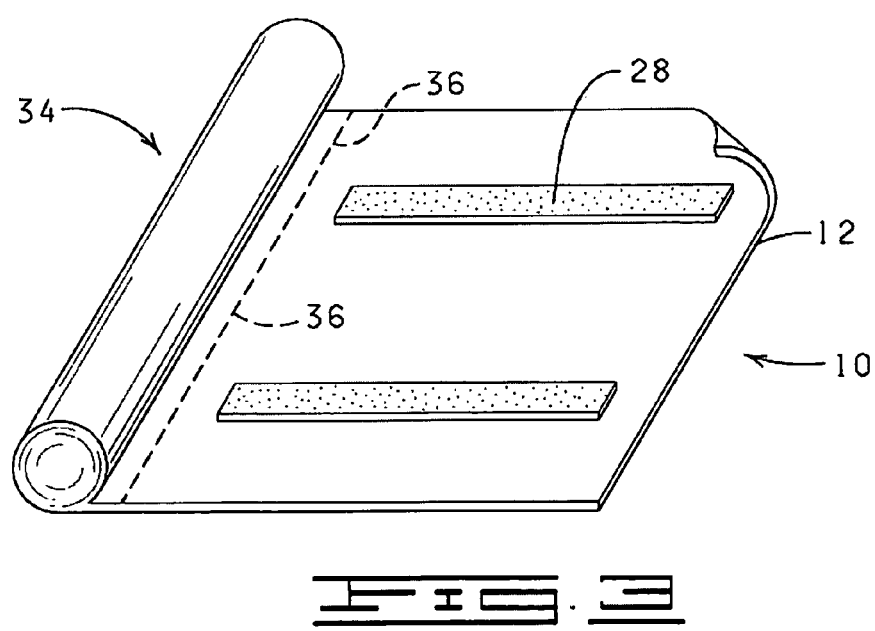

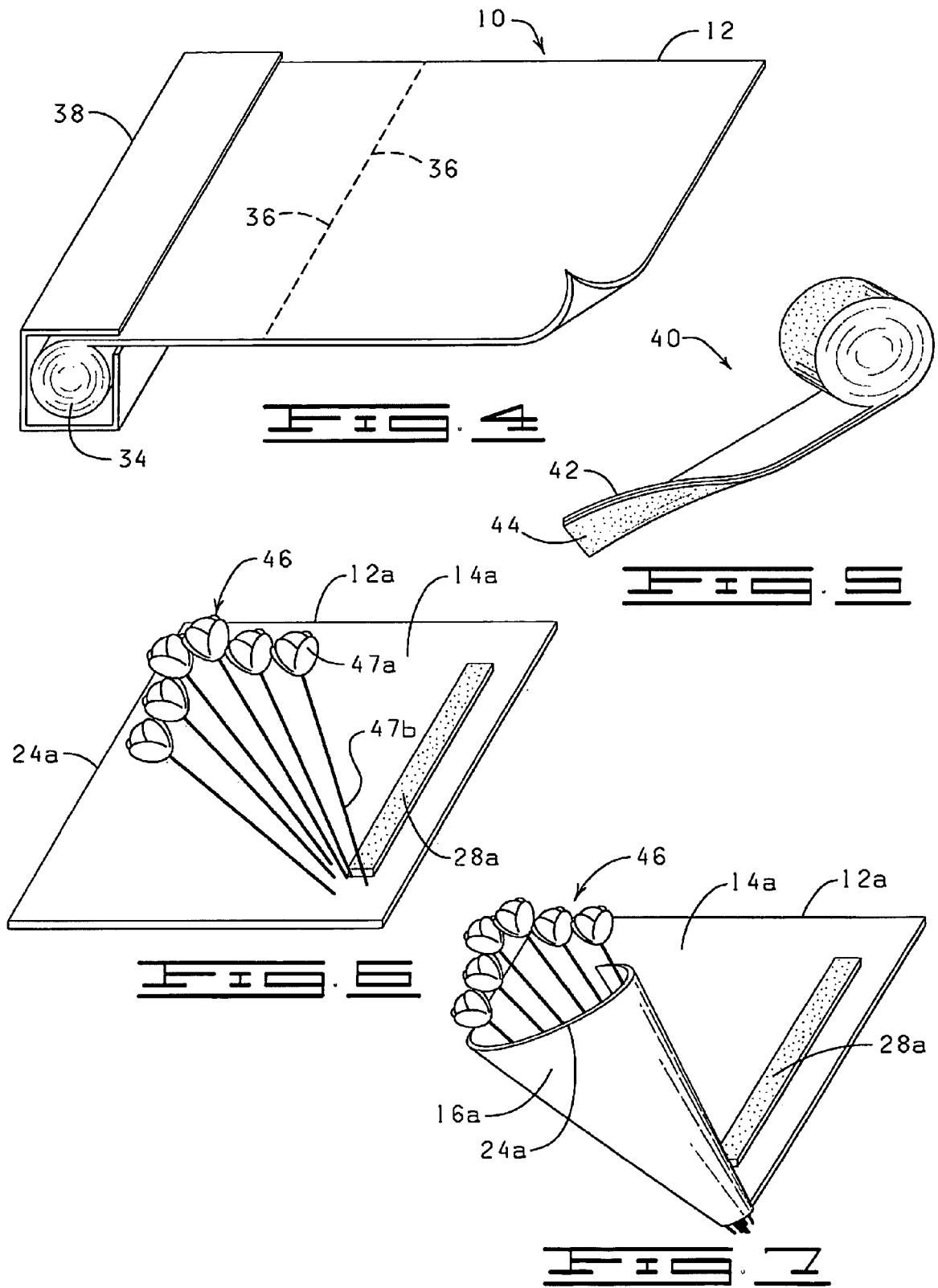

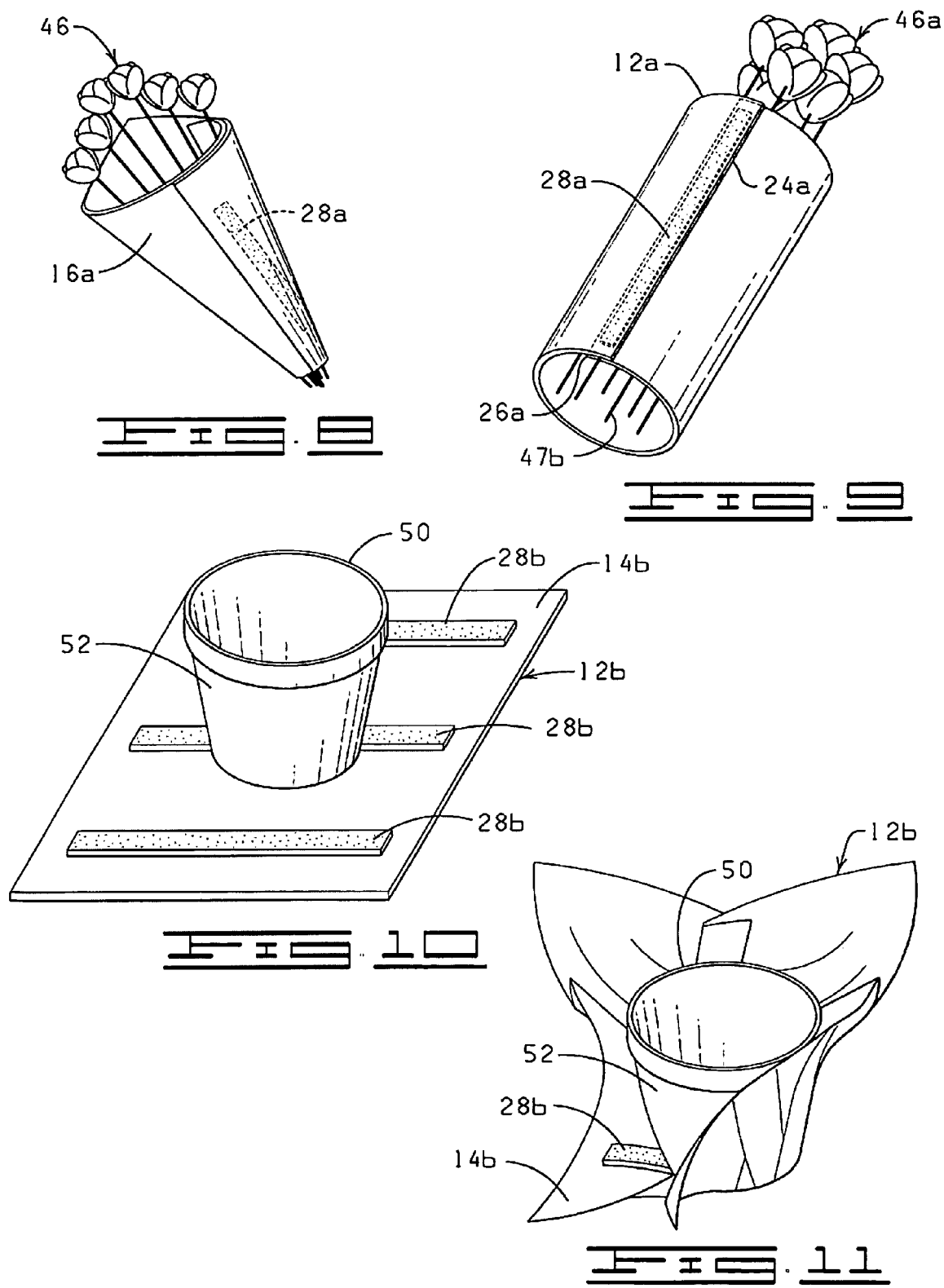

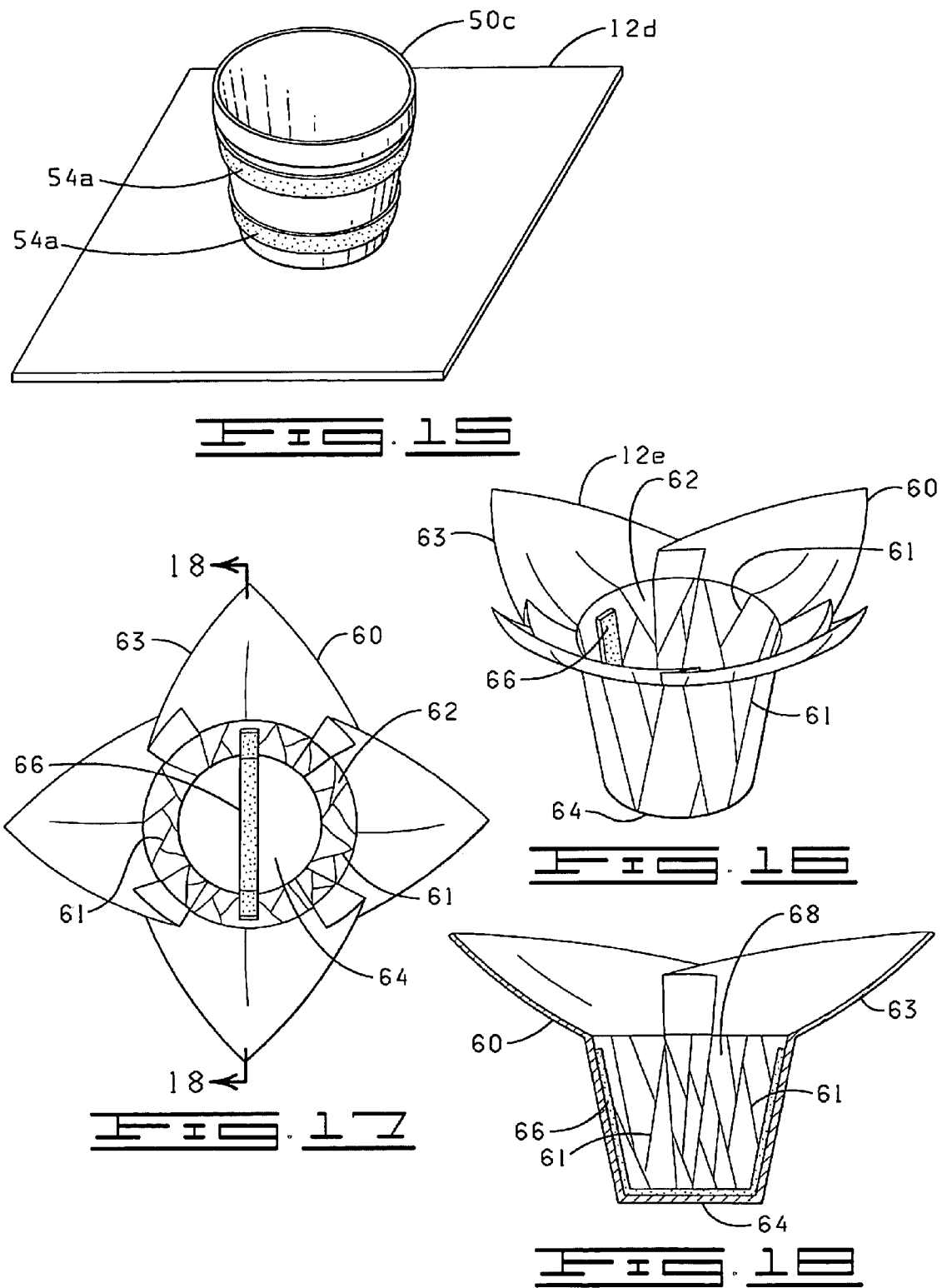

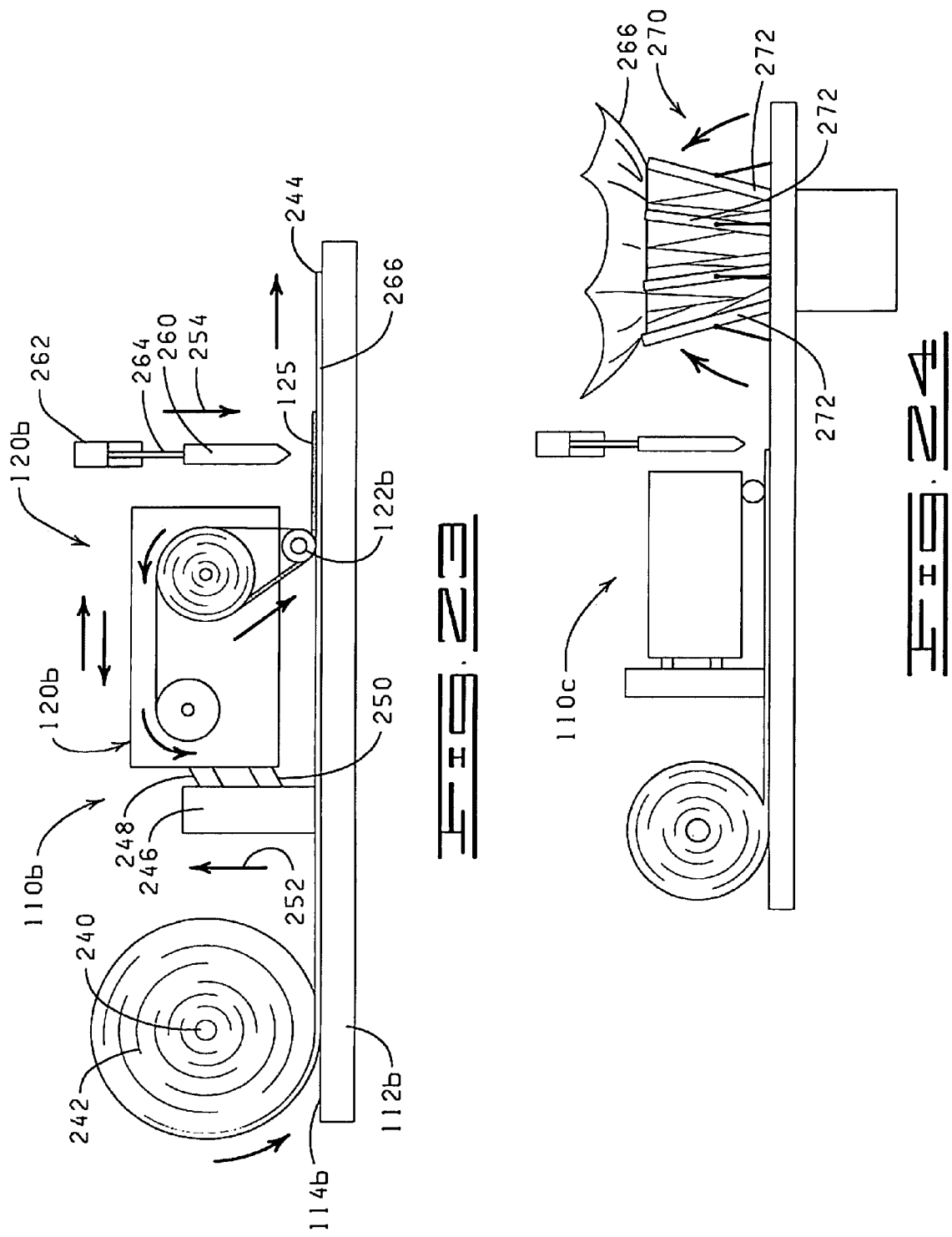

METHOD OF COVERING A FLOWER POT OR FLORAL GROUPING

CROSS-REFERENCE TO RELATED APPLICATIONS

This application is a continuation of U.S. Ser. No. 10/826,616, filed Apr. 16, 2004 now U.S. Pat. No. 6,956,045; which is a continuation of U.S. Ser. No. 10/366,738, filed Feb. 14, 2003 now abandoned; which is a continuation of U.S. Ser. No. 09/819,309, filed Mar. 28, 2001, now U.S. Pat. No. 6,533,886, issued Mar. 18, 2003; which is a continuation of U.S. Ser. No. 09/056,522, filed Apr. 7, 1998, now abandoned; which is a continuation of U.S. Ser. No. 08/440,038, filed May 12, 1995, now U.S. Pat. No. 5,820,712, issued on Oct. 13, 1998; which is a continuation of U.S. Ser. No. 08/003,777, filed Jan. 13, 1993, now U.S. Pat. No. 5,459,976. Each of the before-mentioned are hereby expressly incorporated herein by reference.

FIELD OF THE INVENTION

The present invention relates to dispensers for dispensing sheets of material wherein a sheet of material is passed through an adhesive strip dispenser system for applying an adhesive strip to at least a portion of the sheet of material, and more particularly, but not by way of limitation to such dispensers for wrapping a floral grouping or for providing a decorative cover for a flower pot.

BRIEF DESCRIPTION OF THE DRAWINGS

FIG. 1 is a perspective view of a sheet of material constructed in accordance with the present invention, showing an adhesive strip disposed upon the upper surface.

FIG. 2 is a perspective view of a plurality of sheets of material constructed in accordance with the present invention and forming a continuous roll of material.

FIG. 3 is a perspective view of a plurality of sheets of material, each having two adhesive strips, constructed in accordance with the present invention forming a continuous roll, the roll partially unrolled to reveal a single sheet still attached thereto.

FIG. 4 is a perspective view of a plurality of sheets of material forming a continuous roll of material disposed in a dispenser, prior to the application of an adhesive strip.

FIG. 5 is a perspective view of a partially unrolled roll of adhesive strip tape.

FIG. 6 is a perspective view of a floral arrangement disposed on the sheet of material.

FIG. 7 is a perspective view of the floral arrangement of FIG. 6 being wrapped in one method of wrapping.

FIG. 8 is a perspective view of the floral arrangement wrapped in a conical fashion.

FIG. 9 is a perspective view of another method of using the sheet of material to wrap a floral arrangement.

FIG. 10 is a perspective view of another embodiment of the sheet of material of the present invention, showing three adhesive strips disposed on the upper surface of the sheet of material, and a pot disposed upon the sheet.

FIG. 11 is a perspective view of the sheet of material of FIG. 10, showing the method of disposing the sheet of material about a flower pot.

FIG. 15 is a perspective view of another version of the present invention, wherein adhesive strips are disposed about the outer surface of the flower pot and the pot is disposed upon a sheet of material having no adhesive strips thereupon.

FIG. 16 is a perspective view of a pre-formed decorative pot cover having an adhesive strip disposed upon the inner surface of the pot cover.

FIG. 17 is a plan view of the pot cover shown in FIG. 16.

FIG. 18 is a cross-sectional view of the pot cover shown in FIGS. 16 and 17.

FIG. 23 is a cross-sectional view of an adhesive strip applicator like the apparatus shown in FIG. 21 except it also has a cutting assembly, and the sheets of material are cut from rolls of material.

FIG. 24 is an elevational view of an apparatus similar to the apparatus in FIG. 23 except it is equipped with a cover former for forming the sheet of material about a pot using a cover forming system having pivoting forming members.

DESCRIPTION

The Embodiments of FIGS. 1–5

Figure 12:
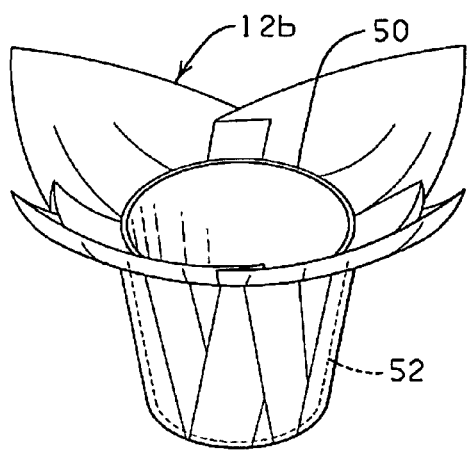
FIG. 12 is a perspective view of the sheet of material of FIG. 10 after the sheet of material has been wrapped about a flower pot.

Referring to FIG. 1, designated generally by the reference numeral 10 is a wrapping material which is constructed in accordance with the present invention. The wrapping material 10 comprises at least one sheet of material 12. The sheet of material 12 has an upper surface 14, a lower surface 16, and an outer periphery 18 (an edge of which is lifted for illustration purposes only). As shown in FIG. 1, the outer periphery 18 of the sheet of material 12 comprises a first side 20, a second side 22, a third side 24, and fourth side 26. An adhesive strip 28 is disposed on at least a portion of one surface of the sheet of material 12, as is illustrated in FIG. 1 and which will be described in further detail below.

The sheet of material 12 can be utilized to wrap a floral arrangement or a flower pot. The term "flower pot" refers to any type of container used for holding a floral arrangement or a potted plant. "Floral arrangement" as used herein means cut fresh flowers, artificial flowers, other fresh and/or artificial plants or other floral materials and may include other secondary plants and/or ornamentation or artificial or natural materials which add to the aesthetics of the overall floral arrangement. The floral arrangement comprises a bloom or foliage portion and a stem portion. However, it will be appreciated that the floral arrangement may consist of only a single bloom or only foliage (not shown). The term "floral arrangement" may be used interchangeably herein with the term "floral grouping".

In the embodiment of FIG. 1, the sheet of material 12 is square. It will be appreciated, however, that any shape or size of sheet 12 may be used to wrap a flower pot or a floral arrangement as long as it is sufficiently sized and shaped to wrap and encompass the flower pot or floral arrangement. For example, the sheet 12 may also comprise other shapes, i.e., rectangular, round, oval, octagonal, asymmetrical, or the like. And multiple sheets of material 12 may be used. Moreover, when multiple sheets of material 12 are used in combination, the sheets of material 12 need not be uniform in size or shape. Finally, it will be appreciated that the sheet of material 12 shown in all embodiments herein is substantially flat.

The sheet of material 12 may be constructed of a single sheet of material or a plurality of sheets. Any thickness of the sheet of material 12 may be utilized in accordance with the present invention as long as the sheet of material 12 may be wrapped about at least a portion of a flower pot or a floral arrangement, as described herein. The sheet of material 12 has a thickness of less than about 1 mil to about 30 mils. Typically, the sheet of material 12 has a thickness in a range of less than about 0.2 mil to about 30 mils. In a preferred embodiment, the sheet of material 12 is constructed from one sheet of polymer film having a thickness in a range of from less than about 0.5 mil to about 2.5 mils.

The sheet of material 12 is constructed from any suitable wrapping material that is capable of being wrapped about a flower pot or floral arrangement. Preferably, the wrapping material 10 comprises paper (untreated or treated in any manner), cellophane, foil, polymer film, fabric (woven or nonwoven or synthetic or natural), burlap, or combinations thereof.

The term "polymer film" means a man-made polymer such as a polypropylene or a naturally occurring polymer such as cellophane. A polymer film is relatively strong and not as subject to tearing (substantially non-earable), as might be the case with paper or foil.

The sheet of material 12 may vary in color. Further, the sheet of material 12 may consist of designs which are printed, etched, and/or embossed thereon; in addition, the sheet of material 12 may have various colorings, coatings, flocking and/or metallic finishes, applied separately or simultaneously or may be characterized totally or partially by pearlescent, translucent, transparent, iridescent or the like, qualities. Each of the above-named characteristics may occur alone or in combination. Moreover, each surface of the sheet of material 12 may vary in the combination of such characteristics.

The sheet of material 12 has a width 30 (FIG. 1) extending generally between the first side 20 and the second side 22, respectively, sufficiently sized whereby the sheet of material 12 can be wrapped about and encompass a floral arrangement or a flower pot. The sheet of material 12 has a length 32 (FIG. 1) extending generally between the third side 24 and the fourth side 26, respectively, sufficiently sized whereby the sheet of material 12 extends over a substantial portion of the floral arrangement when the sheet of material 12 has been wrapped about the floral arrangement in accordance with the present invention, as described in detail below. The sheet of material 12 may be wrapped about a flower pot to substantially wrap and cover the flower pot in accordance with the present invention.

The wrapping material 10 may comprise a plurality of sheets of material 12 connected together to form a roll 34, as shown in FIGS. 2–4. Preferably, the plurality of sheets of material 12 in the roll 34 are connected by perforations 36, as illustrated in FIGS. 3 and 4. Such a roll 34 permits one sheet of material 12 to be withdrawn from the roll 34, the sheet of material 12 being severed from the roll 34. Alternatively, the roll 34 may simply be formed as a continuous roll 34 of wrapping material 10 without perforations, wherein a plurality of sheets of material 12 may be withdrawn from the roll 34 by unrolling a portion of the wrapping material 10 from the roll 34, and using a separate cutting element to sever the unrolled portion of the wrapping material 10 from the roll 34 to form the sheet of material 12. The roll 34 may also be contained within a dispenser 38, as illustrated in FIG. 4. When the roll 34 is disposed in the dispenser 38, a portion of the wrapping material 10 is again unrolled, and a serrated cutting edge (not shown) contained within the dispenser 38, or a separate cutting element (not shown) severs the unrolled portion of the wrapping material 10 from the roll 34 to form a sheet of material 12. Any number of sheets of material 12 may form the roll 34 as long as it is possible to withdraw at least one sheet 12 from the roll 34 as described herein.

Referring again to FIG. 1, the adhesive strip 28 is disposed upon the sheet of material 12, preferably on the upper surface 14 of the sheet 12. The adhesive strip 28 covers at least a portion of the upper surface 14 of the sheet 12. Alternatively, the adhesive strip 28 could be applied only to the lower surface 16 of the sheet of material 12 (not shown), the adhesive strip 28 could be applied to both the upper surface 14 and the lower surface 16 of the sheet of material 12 (not shown), or the adhesive strip 28 could be disposed upon only selected portions of the sheet of material 12, as described below. "Adhesive strip", as used herein, means any adhesive, or any adhesive/cohesive combination, having adhesive qualities (i.e., qualities of adhesion or adhesion/cohesion, respectively) sufficient to cause the attachment of a portion of the sheet 12 to itself, to a flower arrangement, or to a flower pot. Since the adhesive strip 28 may comprise either an adhesive or an adhesive/cohesive combination, it will be appreciated that both adhesives and cohesives are known in the art, and both are commercially available.

The adhesive strip 28 is disposed upon a surface of a sheet of material 12 by appressing a length of a commercially available adhesive transfer tape 40 (FIG. 5) against a portion of the upper surface 14 or lower surface 16 of the sheet of material 12. For example, a commercially available form of the adhesive transfer tape 40 is available from 3M Company in St. Paul, Minn. under the trade name "Scotch ATG Tapes." By "adhesive transfer tape" is meant a tape which has a backing or release strip 42 and an adhesive layer 44 which is readily detachable from the backing or release strip 42, thereby enabling the "transfer" of the adhesive layer 44 to another surface.

When the adhesive transfer tape 40 is appressed to the surface of the sheet 12, the adhesive layer 44 on the adhesive transfer tape 40 is caused to adhere to the portion of the sheet of material 12. When the backing or release strip 42 of the adhesive transfer tape 40 is peeled away and removed, the adhesive layer 44 remains in contact with the sheet of material 12 and thereby leaves the adhesive strip 28 exposed. The exposed surface of the adhesive strip 28 is then available for adherence to another surface such as the outer peripheral surface of a flower pot.

The adhesive strip 28 may be disposed upon a surface of the sheet of material 12 during the process of manufacturing the sheet of material 12, or immediately after the sheet of material 12 has been manufactured, by any method described herein wherein the backing 42 is left covering the adhesive strip 28 on the sheet of material 12. The backing or release strip 42 is removed from the sheet of material 12 before the sheet of material 12 is disposed upon a flower pot or wrapped about a floral arrangement.

In the preferred version of the present invention, the adhesive strip 28 is disposed upon the sheet of material 12 just prior to the use of the sheet of material 12 to wrap a floral arrangement, or to decoratively cover a flower pot.

The adhesive strip 28 may also comprise an antimicrobial agent. "Antimicrobial Agent," as used herein, means an agent possessing antifungal and/or antibacterial and/or known antimicrobial properties. A complete disclosure of such antimicrobial agents is contained within U.S. Ser. No. 07/538,293 filed Jun. 14, 1990 entitled "Antimicrobial Materials and Methods" which is hereby incorporated by reference into the present application.

Ink, dye, pigment, or any combination thereof can be mixed with the adhesive strip 28 to create a colored adhesive strip 28. "Color" as defined herein means any color, combination of colors, mixture of colors, no color, or any combination thereof. Examples of such colors include blue, purple, green, yellow, red, orange, pink, colorless, white, black, gray, brown, or any combination thereof. The above defined colors may be utilized alone, or in any combination.

The colored adhesive strip 28 may also comprise a "spot" or a tab attached to the sheet of material 12. Such as spot or tab designates an edge of the sheet of material 12, so that when a sheet of material 12 is removed from a surface or from being wrapped about an item (for example, a floral arrangement) an operator can easily identify the outer periphery 18 of the sheet of material 12 by the spot or tab, and thus lift the outer periphery 18 of the sheet of material 12 at the spot or tab, to remove the sheet of material 12 from a surface or an item.

The adhesive strip 28 may further comprise, in a preferred embodiment, a scent or fragrance pleasant to humans. Such scents are known in the art, and are commercially available.

The adhesive strip 28 may further comprise, in another version, an insect attracting scent. "Insect attracting scents" as used herein means any scent or combination of scents that are known to attract insects. Examples of such scents include flowers, plants (such as fruits and vegetables), foods (for example, breads, cereals, candies), grasses, food condiments (such as honey, sugar, salt), herbs, spices, woods, roots, and the like. Such scents are known in the art, and are commercially available. An insecticide may also be mixed with the adhesive strip 28. It will be appreciated that insecticides are also well-known in the art, and commercially available.

In the preferred embodiment of the present invention, the adhesive strip 28 is disposed upon a portion of at least one surface of the sheet of material 12. Any thickness of the adhesive strip 28 may be disposed upon a surface of the sheet of material 12 in accordance with the present invention as long as the adhesive strip 28 functions as described herein. The adhesive strip 28, when disposed upon the sheet of material 12, has a thickness of less than about 1 mil to about 30 mils. Typically, the adhesive strip 28 has a thickness in a range of less than about 0.2 mil to about 30 mils. In a preferred embodiment, the adhesive strip 28 is disposed upon one surface of the sheet of material 12 comprising polymer film, the adhesive layer 44 having a thickness in a range of from less than about 0.5 mil to about 2.5 mils.

The adhesive strip 28 may comprise at least a portion of the decoration on the sheet of material 12. That is, any geometric, nongeometric, asymmetrical, or fanciful design ("design" as used herein means "decoration") on the sheet of material 12 may comprise, at least in part, an adhesive strip 28. The adhesive strip 28, when disposed upon the sheet of material 12, may comprise a non-geometric, asymmetrical or fanciful design, or a portion of a design, such as flowers, lace, hearts, ribbons, slogans, logos, and/or any series of letters and/or numbers, and the like (not shown), or any geometric form, for example, triangles, rectangles, octagonals, bands, or pairs of strips, illustrated in FIG. 3 (the foregoing designs hereinafter collectively referred to as "spot" or "spots" of adhesive strip 28).

It will be appreciated, however, that the adhesive strip 28 may comprise one "spot" of adhesive strip 28, or a plurality of "spots" of adhesive strip 28, spread substantially over at least a portion of the upper surface 14 of the sheet of material 12, as long as the plurality of spots of adhesive strip 28 create a sufficient area of adhesion in order to cause the sheet of material 12 to adhere to itself or to another object.

The backing or release strip 42 may be left applied for a period of time to the adhesive strip 28 after it is disposed on a surface of the sheet of material 12 prior to its use as a wrapping material, to protect the adhesive qualities of the adhesive strip 28.

Embodiments of FIGS. 6–9

FIGS. 6–9 illustrate the use of the present invention in wrapping a floral arrangement. A sheet of material 12a with an adhesive strip 28a disposed upon an upper surface 14a is withdrawn and detached from the roll 34 (not shown) by any means described herein, the sheet 12a and the adhesive strip 28a are similar to the sheet 12 and strip 28 described previously. An operator may dispose the sheet of material 12a on a support surface (not shown); the lower surface 16a of the sheet of material 12a contacting the support surface. A floral arrangement 46 is then provided, and disposed upon the upper surface 14a of the sheet of material 12a. The floral arrangement generally has a bloom or foliage portion 47a and a stem portion 47b (shown in FIG. 6). The floral arrangement 46 may be disposed upon the sheet 12a in a diagonal orientation as shown in FIGS. 6–8. Referring to FIGS. 6 and 7, the sheet of material 12a is then wrapped about the floral arrangement 46 by the operator, the operator overlapping a portion of the sheet of material 12a over another portion of the sheet of material 12a. That is, for example, the operator places the third side 24a of the sheet of material 12a over the floral arrangement 46, as shown in FIG. 7. The operator continues to roll the floral arrangement 46 in the direction toward the adhesive strip 28a until the adhesive strip 28a firmly engages the lower surface 16a of the sheet 12a, wherein the floral arrangement 46 is substantially encompassed by the sheet of material 12a, and wherein the adhesive strip 28a on the sheet of material 12a may contact both the sheet 12a and portions of the floral arrangement 46 to substantially encompass and surround a substantial portion of the floral arrangement 46.

It will also be appreciated that a floral arrangement may also have an adhesive strip 28 disposed thereon (not shown) by any method described herein, and be wrapped by a sheet of material 12 having an adhesive strip 28 on a portion of a surface thereof. For instance, the adhesive strip 28 disposed on a portion of the upper surface 14 of the sheet of material 12 may be caused to at least partially contact the adhesive strip 28 on the floral arrangement (not shown) by any method described herein, the sheet of material 12 substantially wrapping and encompassing the floral arrangement. Similarly, it will be appreciated that a surface, for example, a floral arrangement (not shown), or any other surface or object described herein, having an adhesive strip 28 thereon, may be wrapped and/or substantially covered by any method described herein by a sheet of material 12 which has no adhesive strip thereon.

In one preferred embodiment, illustrated in FIG. 9, the sheet of material 12a having an adhesive strip 28a applied near and along third side 24a thereof is utilized to wrap a floral arrangement 46a. The floral arrangement 46a is disposed upon the sheet 12a approximately parallel of the adhesive strip 28a. The sheet of material 12a is wrapped generally about the stem portion 47b of the floral arrangement 46a to a position wherein the third side 24a generally overlaps the fourth side 26a. It should be noted that the sheet of material 12a may be wrapped a plurality of times about the stem portion 47b of the floral arrangement 46a before the overlapping of the third side 24a and the fourth side 26a. In this position, the portion of the sheet of material 12a near the fourth side 26a thereof having the adhesive strip 28a thereon is disposed generally adjacent another portion of the sheet of material 12a and the two adjacent portions then are brought into contact and adhesively connected, thereby securing the sheet of material 12a generally about the floral arrangement 46a shown in FIG. 9.

Embodiments of FIGS. 10–12

In another version of the present invention, a sheet of material 12b having one or more adhesive strips 28b disposed on an upper surface 14b of the sheet 12b is used to wrap or decoratively cover a flower pot 50 having an outer surface 52. The flower pot 50 is placed upon the upper surface 14b of the sheet 12b as shown in FIG. 10.

The sheet of material 12b is then manually wrapped around the flower pot 50 by being formed and molded upward around the flower pot 50 by the operator, the upper surface 14b and the one or more adhesive strips 28b thereon contacting the outer surface 52 of the flower pot 50 (FIG. 11). The sheet of material 12b is thereby formed about the flower pot 50 and the sheet of material 12b substantially surrounds and covers the outer surface 52 of the flower pot 50 (FIG. 12). The sheet of material 12b may also be wrapped about the pot 50 by an automatic wrapping apparatus, such as the article forming system with pivoting forming members described in greater detail below.

Figure 13:
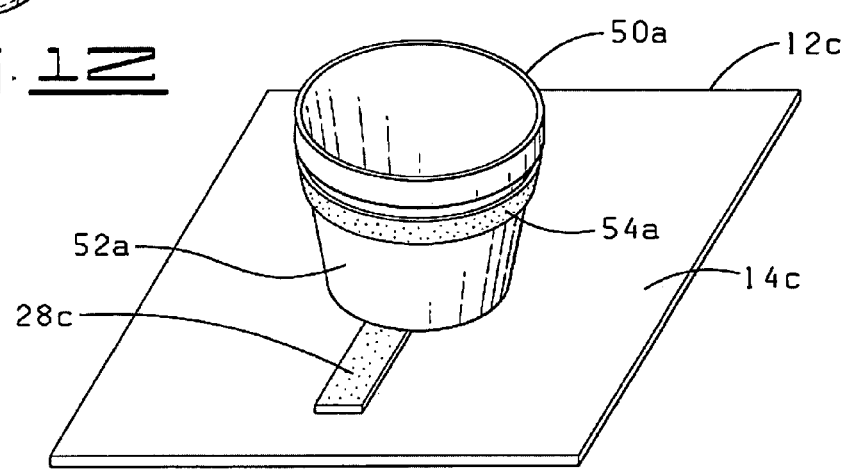
FIG. 13 is a perspective view of another version of the present invention, showing a flower pot having an adhesive strip on the outer surface and disposed upon a sheet of material having an adhesive strip thereupon.
Figure 14:
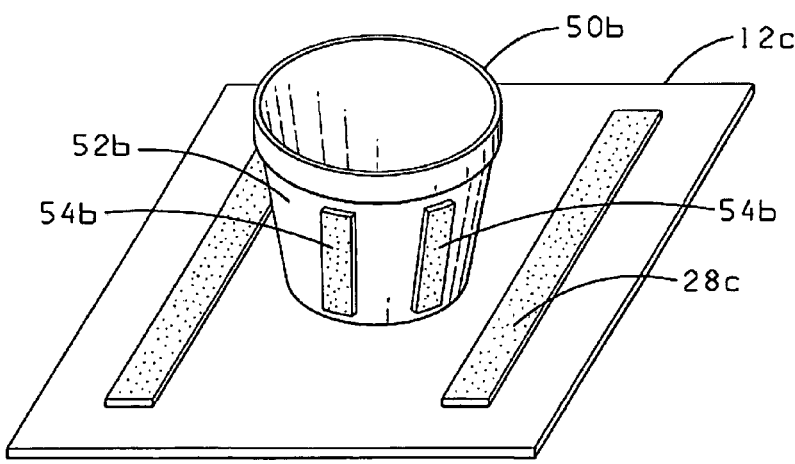
FIG. 14 is a perspective view of another version of the present invention, showing a flower pot having adhesive strips disposed thereupon and disposed upon another version of the sheet of material of the present invention.

The Embodiment of FIGS. 13–15

In an alternative embodiment and method shown in FIG. 13 a flower pot 50a having an outer surface 52a and an adhesive strip 54a disposed thereon is provided. A sheet of material 12c, which is constructed similar to the sheet of material shown in FIG. 1, is also provided, an adhesive strip 28c being disposed by any method described herein on the upper surface 14c of the sheet of material 12c. The operator disposes the sheet of material 12c on a support surface (not shown). The operator then disposes the flower pot 50a upon the upper surface 14c of the sheet of material 12c and upon or adjacent the adhesive strip 28c thereon. The operator then causes the sheet of material 12c to contactingly engage the outer surface 52a of the flower pot 50a, and the adhesive strip 54a thereon. The sheet of material 12c is thereby caused to substantially surround and cover the outer surface 52a of the flower pot 50a, wherein said adhesive strip 54a on the flower pot 50a contactingly engages the sheet of material 12c, and the adhesive strip, respectively, thereon to effectively cause a firm engagement of the sheet of material 12c to the outer surface 52a of the flower pot 50a.

The flower pot 50a of FIG. 13 shows the adhesive strip 54a in a circumferential position about the outer surface 52a of the pot 50a. Alternatively, the adhesive strip may be positioned in a vertical manner such as the adhesive strip 54b in FIG. 14 or in other positions such as diagonal (not shown) or spiral (not shown).

In an alternative embodiment and method of use a flower pot 50c has at least one adhesive strip 54a disposed thereon (or two as shown in FIG. 15) and the flower pot 50c is substantially wrapped by a sheet of material 12d having no adhesive strip thereon but otherwise constructed similar to the same as the sheet of material in FIG. 1. The flower pot 50c is wrapped by any method described herein.

Embodiments of FIGS. 16–20

In an alternative embodiment and method shown in FIGS. 16–20, a sheet of material 12e, which is constructed similar to the sheet of material 12 shown in FIG. 1, has been preformed into a flower pot cover 60 having overlapping folds 61. The flower pot cover 60 (also referred to as a preformed flower pot cover) has an inner surface 62 and a bottom surface 64 (FIGS. 16–8) and may have a skirt 63. An adhesive strip 66 is disposed manually or automatically upon a portion of the inner surface 62 of the flower pot cover 60. The adhesive strip 66 may remain covered by a backing or release strip (not shown) which covers the adhesive of the adhesive strip 66 and prevents the adhesive strip 66 from adhering to an object until so desired. The operator may manually or automatically dispose the flower pot cover 60 on a support surface (not shown). The release strip, if present, is removed to expose the adhesive strip 66. The flower pot (not shown) is then manually or automatically inserted into an opening 68 (shown in FIG. 18) provided in the flower pot cover 60. The adhesive strip 66 on the inner surface 62 of the flower pot cover 60 is made to contactingly engage the outer surface of the flower pot inserted into the opening 68 (for example by applying gentle pressure to the external surface of the flower pot cover 60 corresponding to the area of the adhesive strip 66. The flower pot cover 60 substantially surrounds and covers the outer surface of the flower pot, wherein said adhesive strips 66 on the flower pot cover 60 effectively cause the attachment of the flower pot cover 60 to the flower pot. The adhesive strip 66 is shown in the version in FIGS. 16–18 as vertically oriented upon the inner surface 62 of the flower pot cover 60. One or more adhesive strips 66 may be thus applied. Additionally, a portion of the adhesive strip 66 may be positioned upon the bottom surface 64 of the flower pot cover 60 to enhance attachment of the flower pot cover 60 to a flower pot disposed therein.

Figure 19:
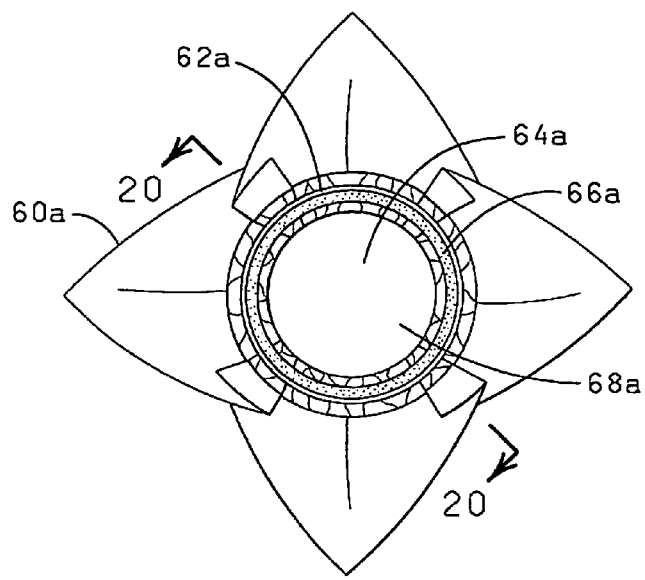
FIG. 19 is a plan view of a pre-formed pot cover having an adhesive strip disposed in a circumferential orientation about the inner surface of the cover.
Figure 20:
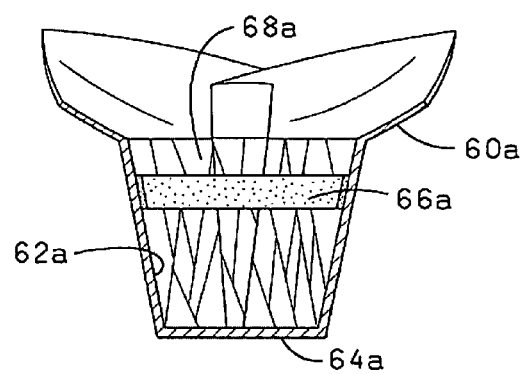
FIG. 20 is a cross-sectional view of the pot cover shown in FIG. 19.

In another version of the invention, an adhesive strip 66a may be disposed in a flower pot cover 60a having an inner surface 62a, a bottom 64a, and an adhesive strip 66a positioned circumferentially on the inner surface 62a below the opening 68a of the flower pot cover 60a, such as shown in FIGS. 19–20. There may be one or more adhesive strips 66a positioned in such a manner upon the inner surface 62a of the flower pot cover 60a. Alternatively, the adhesive strips 66 or 66a may be segmented such that the adhesive strips 66 and 66a are not continuous (not shown). Additionally, the adhesive strips 66 and 66a may be covered with a backing or release strip (not shown) which must be removed, as discussed above, prior to the adhesion of the adhesive strip to an object, such as a flower pot, disposed therein.

In an alternative embodiment and method of use, a flower pot having an adhesive strip disposed thereon, such as the flower pots 50a–50c in FIGS. 13–15, is substantially covered by a flower pot cover having an adhesive strip 66–66a thereon, such as the flower pot covers 60–60a in FIGS. 16–20. A flower pot (not shown) is disposed in the opening of the flower pot cover 60–60a. Gentle pressure exerted against the flower pot cover 60–60a causes the adhesive strip 66–66a of the flower pot cover 60–60a to contactingly engage the outer surface of the flower pot and similarly causes the adhesive strip of the flower pot to contactingly engage the flower pot cover 60–60a thereby causing the attachment of the flower pot cover 60–60a to the flower pot. Similarly, the adhesive strip 66–66a of the flower pot cover 60–60a may contactingly engage the adhesive strip of the flower pot.

Figure 21:
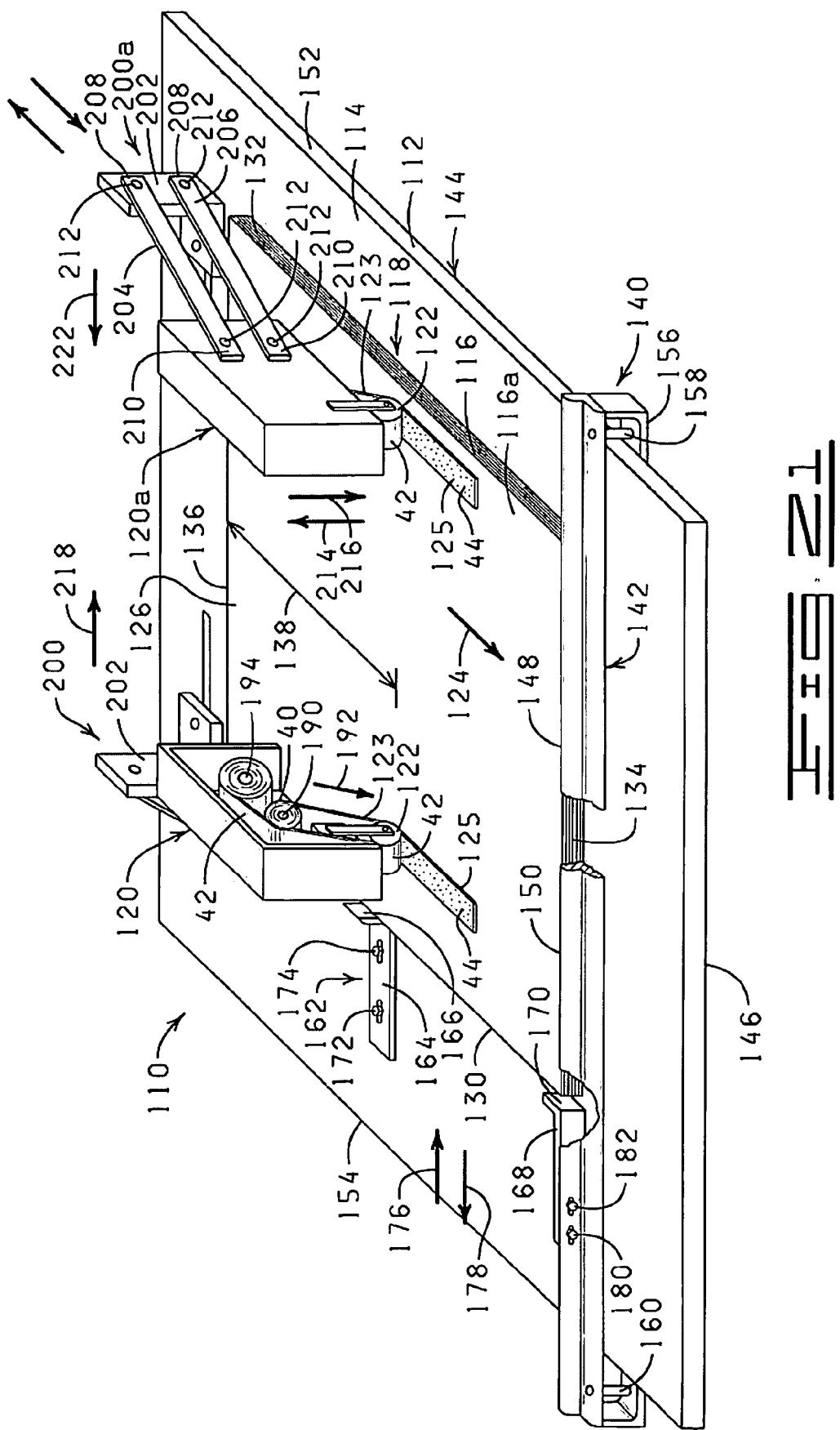
FIG. 21 is a cutaway perspective view of a material dispenser constructed in accordance with the present invention, wherein the material is supplied as pre-cut sheets.

Embodiment of FIG. 21

Shown in FIG. 21 and designated therein by the general reference numeral 110 is a material and adhesive strip dispenser constructed in accordance with the present invention. The material and adhesive strip dispenser 110 basically comprises a material support 112 having a support surface 114 which is adapted to support a plurality of sheets of material stacked one on top of the other to form a stack of sheets of material (each sheet of material being designated in FIG. 21 by the reference numeral 116 and the stack of sheets of material being designated in FIG. 21 by the general reference numeral 118) and adhesive strip applicators 120 and 120a having contact assemblies 122 and 122a (FIG. 21). The stack of sheets of material 118 has a top sheet of material 116a which is the sheet of material 116 disposed on top of the stack of sheets of material 118. The contact assembly 122 of the adhesive strip applicator 120 serves to appress a portion of an adhesive transfer tape 123 between the contact portion and the sheet of material 116a which causes the adhesive transfer tape 123 to contactingly engage a portion of the top sheet of material 116a.

In operation, an operator grips the top sheet of material 116a and pulls the top sheet of material 116a in a direction 124, thereby pulling the top sheet of material 116a generally through or under the adhesive strip applicator 120. As the top sheet of material 116a is pulled through the adhesive strip applicator 120, the contact assembly 122 appresses the adhesive transfer tape 123 against the top sheet of material 116a being passed therethrough and applies an adhesive strip 125 to the top sheet of material 116a thereby providing a sheet of material 116a with an adhesive strip 125 applied to at least one portion thereof and causing the next sheet of material 116 in the stack of sheets of material 118 to form a new or another top sheet of material 116a.

Each sheet of material 116 has an upper surface 126, a lower surface (not shown), a left edge 130, a right edge 132, a front edge 134 and a rear edge 136. The stack of sheets of material 118 is positioned on the support surface 114 with a portion of the stack of sheets of material 118 being positioned generally beneath or in close proximity to the adhesive strip applicator 120 so that the contact assembly 122 of the adhesive strip applicator 120 contacts a portion of the upper surface 126 of the top sheet of material 116a at a position generally between the front edge 134 and the rear edge 136 and, more particularly, at a position spaced a distance 138 from the rear edge 136 of the top sheet of material 116a. Thus, as the top sheet of material 116a is pulled in the direction 124, the adhesive strip applicator 120 applies an adhesive strip 125 to a portion of the upper surface 126 of the top sheet of material 116a.

The material support 112 includes a guide assembly 140 which is connected to the support surface 114 and adapted to guidingly position the stack of sheets of material 118 at a predetermined position on the support surface 114 so that the contact assembly 122 of the adhesive strip applicator 120 contacts a predetermined portion of the upper surface 126 of the top sheet of material 116a at the position spaced the distance 138 from the rear edge 136 of the top sheet of material 116a. The guide assembly 140 comprises a front edge guide 142 which is movably connected to the support surface 114. More particularly, the material support 112 includes a table 144 with the support surface 114 formed on a portion of the table 144 and the table 144 has a lower surface 146.

The front edge guide 142 comprises a top bar 148 having a front edge guide surface 150 positioned on the support surface 114 and extending generally between opposite sides 152 and 154 of the table 144. The front edge guide 142 also includes a lower bar 156 which is positioned generally on the support surface 114 of the table 144 and extends generally between the opposite sides 152 and 154 of the table 144. The top bar 148 is connected to the lower bar 156 via a pair of bolts 158 and 160. In operation, the bolts 158 and 160 each are loosened and the top bar 148 and lower bar 156 are slidingly moved on the table 144 to position the front edge guide surface 150 at a predetermined position for engaging the front edge 134 of the stack of sheets of material 118 for positioning the stack of sheets of material 118 in a predetermined position in one direction.

The guide assembly 140 also includes a left edge guide 162 which is positioned on the support surface 114 for engaging the left edges 130 of the sheets of material 116 in the stack of sheets of material 118 for positioning the stack of sheets of material 118 on the support surface 114 in one other direction. The left edge guide 162 comprises a first guide plate 164 having a left edge guide surface 166 and a second guide plate 168 having a left edge guide surface 170. The first guide plate 164 is movably and adjustably supported on the support surface 114 of the table 144 via a pair of bolts 172 and 174 so that the bolts 172 and 174 may be loosened and the first guide plate 164 moved in a direction 176 or 178 to adjustably position the left edge guide surface 166. The second guide plate 168 is movably and adjustably supported on the top bar 148 via a pair of bolts 180 and 182 so that the bolts 180 and 182 may be loosened and the second guide plate 168 moved in the direction 176 or 178 to adjustably position the left edge guide surface 170 on the support surface 114 of the table 144. The left edge guide surfaces 166 and 170 of the first and the second guide plates 164 and 168 each engage the left edges 130 of the sheets of material 116 and the stack of sheets of material 118 for positioning the stack of sheets of material 118 in one direction on the support surface 114 of the table 144.

The adhesive strip applicator 120 may comprise a weight or spring (not shown) disposed thereupon to bias the contact assembly 122 in a position which ensures that the contact assembly 122 maintains contacting engagement with the top sheet of material 116a in the stack of sheets of material 118.

The adhesive strip applicator 120, examples of which are commercially available, comprises a feed roller 190 upon which is disposed the roll of adhesive transfer tape 40 (FIG. 5). A portion of adhesive transfer tape 123 is fed in direction 192 to the contact assembly 122. As the contact assembly 122 appresses the adhesive transfer tape 123 against the sheet 116a, the adhesive layer 44 of the adhesive transfer tape 123 peels away from the backing 42 forming the adhesive strip 125 on the sheet 116a. The backing 42 which is now separate from the adhesive layer 44 is taken up by the take up roller 194.

A support assembly 200 is secured to the support surface 114 of the table 144. The support assembly 200 comprises a support post 202 and pair of armatures 204 and 206. Each armature 204 and 206 is pivotally connected on the first end 208 to the support post 202 and pivotally connected on the second end 210 to the adhesive strip applicator 120.

The pivotal connection 212 of the armatures 204 and 206 to the support post 202 and to the adhesive strip applicator 120 permit the adhesive strip applicator 120 to be moved in the upward direction 214 or the downward direction 216 to accommodate different thicknesses of stacks of sheets of material 118 while maintaining the contact assembly 122 disposed in a plane generally coplanar with the planer disposition of the top sheet of material 116a or the support surface 114 of the table 144.

In operation, the adhesive strip applicator 120 is moved in the upward direction 214 and the stack of sheets of material 118 is positioned on the support surface 114 of the table 144. The adhesive strip applicator 120 then is moved in the direction 216 to a position wherein the contact assembly 122 engages the top sheet of material 116a. The top sheet of material 116a then is gripped by an individual and pulled in the direction 124. As the top sheet of material 116a is pulled in the direction 124, the contact assembly 122 contactingly engages a portion of the top sheet of material 116a and applies an adhesive strip 125 thereto as the top sheet of material 116a passes adjacent the applicator 120, thereby providing a top sheet of material 116a having an adhesive strip 125 formed on a predetermined portion thereof as shown in FIG. 21.

As the sheet of material 116a is pulled and passed adjacent adhesive strip applicator 120, the contact assembly 122 of the adhesive strip applicator 120 applies an adhesive strip 125 to the sheet of material 116a.

The material and adhesive strip dispenser 110 is shown in FIG. 21 as having a pair of adhesive strip applicators 120 and 120a. It will be understood by one of ordinary skill in the art that the material and adhesive strip dispenser 110 may be equipped with a single adhesive strip applicator 120 in certain applications but may be equipped with two or more adhesive strip applicators 120 in certain other applications.

The positions of the support assemblies 200 may be adjusted to suit the particular adhesive layer applications desired. For example, the support assembly 200 may be adjusted in direction 218 to move the adhesive strip applicator 120 to a position more central to the sheet of material 116a. Similarly, the support assembly 200a may be moved in direction 222 to move the adhesive strip applicator 120a to a position more central to the sheet of material 116a.

Another embodiment of the material and adhesive strip dispenser (not shown) may comprise adhesive strip applicators oriented in diagonal positions. Another embodiment of the material and adhesive strip dispenser may comprise adhesive strip applicators which are perpendicular to one another and thus apply adhesive strips which are perpendicular.

Another version of the material and adhesive strip dispenser may comprise movable adhesive strip applicators which themselves move during application of the adhesive strip which the sheet of material 116a remains stationary beneath the adhesive strip applicators.

The material and adhesive strip dispenser 110 may be located near the place where the floral arrangements 46 are located. In this case, it is contemplated that the adhesive strip 28 is applied to the sheet of material 12 and the sheet of material 12 then is wrapped about the floral arrangement 46 in a continuous process.

Figure 22:
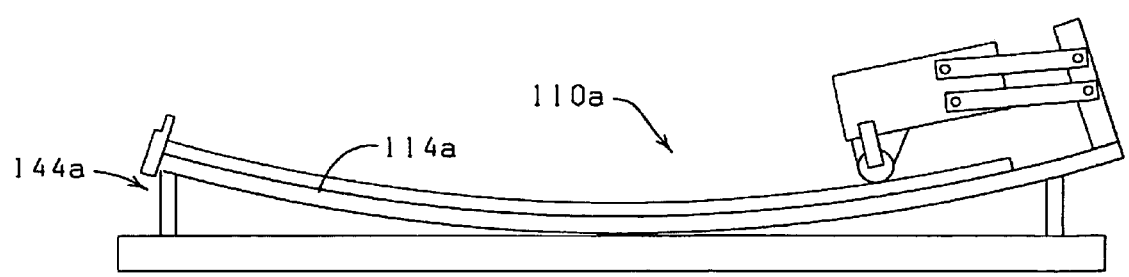
FIG. 22 is an elevational view of a modified material dispenser, similar to the material dispenser of FIG. 21, but showing a curved material support base.

Embodiments of FIGS. 22–24

Turning now to FIG. 22, a modified material and adhesive strip dispenser is represented by the reference numeral 110a. The modified material and adhesive strip dispenser 110a is constructed similar to the material and adhesive strip dispenser 110 described in detail before, except the support surface 114a of the table 144a is formed on a curved path to facilitate the wrapping of a floral arrangement (not shown) in the manner like that described before with respect to FIG. 21.

Shown in FIG. 23 is a version of the material and adhesive strip dispenser designated by the reference numeral 110b. The adhesive strip applicator 120b is constructed similar to the adhesive strip applicator 120 described in detail before. The material and adhesive strip dispenser 110b includes a material support 112b having a support surface 114b and a rod 240 which is supported in a position generally spaced a distance above the support surface 114b. A roll of material 242 is supported on the rod 240. The roll of material 242 has a leading end 244.

The material and adhesive strip dispenser 110b includes a support post 246 pivotally connected by a first arm 248 and a second arm 250 to the adhesive strip applicator 120b. The adhesive strip applicator 120b may be pivotally adjusted on the support post 246 connected thereto in an upward direction 252 or in a downward direction 254.

The material and adhesive strip dispenser 110b also includes a knife 260 and a hydraulic cylinder 262 having a cylinder rod 264 reciprocatingly disposed therein. One end of the cylinder rod 264 is connected to the knife 260. The hydraulic cylinder 262 is connected to a fluid or air supply (not shown) for controlling the hydraulic cylinder 262 to move the cylinder rod 264 and the knife 260 connected thereto in the direction 252 or the direction 254.

In operation, the adhesive strip applicator 120b is disposed a distance above the support surface 14b of the material support 112b. In a similar manner, the hydraulic cylinder 262 is actuated to move the knife 260 in the direction 252 to a position wherein the knife 260 is spaced a distance above the support surface 114b. In this position of the adhesive strip applicator 120b and the knife 260, a manual or automatic operator grips the leading end 244 of the roll of material 242 and unrolls a portion of material 266 from the roll of material 242, passing the material generally between the adhesive strip applicator 120b, the knife 260 and the support surface 114b.

After a predetermined amount of material 266 has been unrolled from the roll of material 242, the adhesive strip applicator 120b is moved in the downward direction 254 to a position wherein the contact assembly 122b of the adhesive strip applicator 120b contactingly engages the material 266 disposed thereunder. In this position of the adhesive strip applicator 120b, the material 266 is pulled from the roll of material 242 passing a predetermined amount of material 266 under the adhesive strip applicator 120b and the adhesive strip applicator 120b applies an adhesive strip 125 to the material 266 passed thereunder. After the adhesive strip 125 has been applied to a predetermined length of material via the adhesive strip applicator 120b, the operator may then actuate the adhesive strip applicator 120b in an upward direction 252 to a position wherein the adhesive strip applicator 120b again is spaced a distance above the support surface 114b and the material 266 supported thereon. The material 266 then is unrolled from the roll of material 242 thereby passing under the knife 260 the length of material 266 to which the adhesive strip 125 has been applied. After the portion of the material 266 having the adhesive strip 125 applied thereto has been passed under the knife 260, the hydraulic cylinder 262 then is actuated to move the knife 260 in the downward direction 254 to a position wherein the knife 260 cuttingly engages the material 266 disposed thereunder to provide a separate sheet of material having an adhesive strip applied to a portion thereof in a manner like that described previously.

The material 266 can be automatically unrolled from the roll of material 242, via feed rollers (not shown) for example. The actuation of the adhesive strip applicator 120b and the hydraulic cylinder 262 and the knife 260 can be controlled along with the feed rollers to automate the application of the adhesive strip 125 application and cutting process described before.

Although the material dispensers described herein specifically have been described as providing a sheet of material with an adhesive strip thereon for wrapping a floral arrangement, the sheets of material with adhesive thereon could be used to wrap other floral items or non-floral items.

An adhesive strip applicator could be constructed to apply an adhesive strip only to the left edge or the right edge or both the left edge and the right edges of the sheet of material by changing the position of the adhesive strip applicator or by attaching one or more additional adhesive strip applicators to the material dispenser. In addition, an adhesive strip applicator could be connected to a hydraulic cylinder and controlled so that one or more adhesive strip applicators could be controllingly moved into and out of engagement with the sheet of material to apply adhesive strips at selective spots or portions on the sheet of material which may be desirable in some applications. Also, the armatures 204 and 206 in FIG. 21 and first arm 248 and second arm 250 in FIG. 23 could be connected via a linkage to a foot operated pedal (not shown) for manually moving the armatures thereby moving the adhesive strip applicators into and out of engagement with the sheet of material for selectively applying the adhesive to selected portions of the sheet of material. In lieu of a foot operated mechanism, the linkage could be powered via various driving means.

Another version of the material and adhesive strip dispenser is shown in FIG. 24 and is designated by the reference numeral 10c. In this version, the dispenser 10c is similar to the dispenser 110b shown in FIG. 23 except that the dispenser 110c is equipped with a cover forming apparatus 270 with pivoting members 272 which, in operation, cause the sheet of material 266 to be automatically formed around the outer peripheral surface of a flower pot (not visible) which is disposed upon the sheet of material 266 as it rests upon the cover forming apparatus 270. Examples of various embodiments of such a cover forming apparatus 270 are described in the co-pending U.S. patent application Ser. No. 07/927,891, entitled "Cover Forming Apparatus Having Pivoting Forming Members", filed Aug. 10, 1992, now U.S. Pat. No. 5,291,721, issued Mar. 8, 1994, and hereby specifically incorporated herein by reference.

The adhesive strip applicator can be constructed in various sizes and shapes to apply different patterns, thickness and widths of adhesives on the sheet of material. By varying the direction of the pull of the sheet of material under the adhesive strip applicator for example, the adhesive strip pattern placed on the sheet of material can be spots, bars, stripes, swirls, circles or any other specific pattern. The adhesive strip pattern placed on the sheet of material can be adapted to facilitate any special wrap or package shape. For example, the adhesive strip pattern could be placed on all edges of the sheet of material, across the sheet of material diagonally and various other patterns. Also, the pattern of adhesive strips on the sheet of material could be placed on the sheet of material so as to avoid or correspond to special printing on the sheet of material. In addition, pigments and/or glitter or other decorative compositions could be added to the adhesive strip to obtain different or various visual or aesthetic effects.

Changes may be made in the various components, elements and assemblies described herein and changes may be made in the steps or sequence of steps of the methods described herein without departing from the spirit and scope of the invention as defined in the following claims.

What is claimed is:

1. A method for covering a flower pot, comprising the steps of:
   providing a roll of material;
   passing at least a portion of the roll of material through an adhesive applicator to provide an adhesive on at least a portion of the roll of material;
   cutting the roll of material to provide a sheet of material having adhesive on at least a portion of the sheet of material;
   forming the sheet of material into a pot cover having an outer surface, an inner surface and an interior space;
   providing a flower pot having an outer surface; and
   placing the flower pot into the interior space of the pot cover wherein the pot cover is secured to at least a portion of the outer surface of the flower pot via the adhesive.

2. The method of claim 1 wherein, in the step of forming the sheet of material into a pot cover, the pot cover comprises a base.

3. The method of claim 1 wherein, in the step of forming the sheet of material into a pot cover, the pot cover comprises a skirt.

4. The method of claim 1 wherein, in the step of forming the sheet of material into a pot cover, the pot cover has a bottom.

5. The method of claim 1 wherein, in the step of providing a flower pot, a bonding material is disposed on at least a portion of the outer surface of the flower pot.

6. The method of claim 1 wherein, in the step of forming the sheet of material into a pot cover, the pot cover is shape-sustaining.

7. The method of claim 1 wherein, in the step of providing a roll of material, the roll of material is formed of a material selected from the group consisting of paper, cellophane, foil, polymer film, woven fabric, nonwoven fabric, synthetic fabric, natural fabric, burlap and combinations thereof.

8. The method of claim 1 wherein, in the step of placing the flower pot into the interior space of the pot cover, the flower pot has a bottom and the pot cover is disposed about the flower pot so as to cover the bottom and at least a portion of the outer surface of the flower pot.

9. A method for covering a flower pot, comprising the steps of:
   providing a roll of material;
   unrolling a portion of the roll of material to provide an unrolled portion;
   applying an adhesive to the unrolled portion of the roll of material; cutting the unrolled portion of the roll of material having an adhesive applied to at least a portion thereof to provide a sheet of material having an adhesive on at least a portion thereof;
   forming the sheet of material into a pot cover having an outer surface, an inner surface and an interior space;

providing a flower pot having an outer surface; and placing the flower pot into the interior space of the pot cover wherein the pot cover is secured to at least a portion of the outer surface of the flower pot via the adhesive.

10. The method of claim 9 wherein, in the step of forming the sheet of material into a pot cover, the pot cover comprises a base.

11. The method of claim 9 wherein, in the step of forming the sheet of material into a pot cover, the pot cover comprises a skirt.

12. The method of claim 9 wherein, in the step of forming the sheet of material into a pot cover, the pot cover has a bottom.

13. The method of claim 9 wherein, in the step of providing a flower pot, a bonding material is disposed on at least a portion of the outer surface of the flower pot.

14. The method of claim 9 wherein, in the step of forming the sheet of material into a pot cover, the pot cover is shape-sustaining.

15. The method of claim 9 wherein, in the step of providing a roll of material, the roll of material is formed of a material selected from the group consisting of paper, cellophane, foil, polymer film, woven fabric, nonwoven fabric, synthetic fabric, natural fabric, burlap and combinations thereof.

16. The method of claim 9 wherein, in the step of placing the flower pot into the interior space of the pot cover, the flower pot has a bottom and the pot cover is disposed about the flower pot so as to cover the bottom and at least a portion of the outer surface of the flower pot.

* * * * *